United States Patent
Khasnabish et al.

(10) Patent No.: US 11,516,634 B2
(45) Date of Patent: Nov. 29, 2022

(54) METHODS AND SYSTEM FOR ROBUST SERVICE ARCHITECTURE FOR VEHICLE-TO-EVERYTHING COMMUNICATIONS

(71) Applicant: Verizon Patent and Licensing Inc., Basking Ridge, NJ (US)

(72) Inventors: Bhumip Khasnabish, Lexington, MA (US); Rohit Shirish Saraf, Nashua, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 256 days.

(21) Appl. No.: 17/035,939

(22) Filed: Sep. 29, 2020

(65) Prior Publication Data
US 2022/0103985 A1    Mar. 31, 2022

(51) Int. Cl.
*H04W 4/40* (2018.01)
*H04W 4/50* (2018.01)
*H04W 76/10* (2018.01)
*H04W 48/18* (2009.01)

(52) U.S. Cl.
CPC .............. *H04W 4/40* (2018.02); *H04W 4/50* (2018.02); *H04W 48/18* (2013.01); *H04W 76/10* (2018.02)

(58) Field of Classification Search
CPC ......... H04W 4/40; H04W 4/50; H04W 76/10; H04W 48/18
See application file for complete search history.

(56) References Cited

U.S. PATENT DOCUMENTS

| | | | |
|---|---|---|---|
| 10,484,911 B1* | 11/2019 | Bogineni | H04W 76/10 |
| 2018/0287891 A1* | 10/2018 | Shaw | H04W 24/02 |
| 2019/0098569 A1* | 3/2019 | Hou | G06F 16/2471 |
| 2019/0230645 A1* | 7/2019 | Cheng | H04W 12/06 |
| 2020/0312142 A1* | 10/2020 | Su | G05D 1/0285 |
| 2020/0313959 A1* | 10/2020 | Higuchi | H04W 48/18 |
| 2020/0374792 A1* | 11/2020 | Liu | H04W 48/18 |
| 2021/0168031 A1* | 6/2021 | Stockert | H04L 41/0806 |
| 2021/0219204 A1* | 7/2021 | Shi | H04W 28/0284 |
| 2021/0219219 A1* | 7/2021 | Sundararaj | H04W 48/18 |
| 2021/0306853 A1* | 9/2021 | Gundavelli | H04W 12/06 |
| 2021/0352609 A1* | 11/2021 | Kiefer | H04W 4/023 |
| 2022/0015088 A1* | 1/2022 | Pateromichelakis | H04L 41/0853 |
| 2022/0029892 A1* | 1/2022 | Hooli | H04L 41/16 |
| 2022/0038534 A1* | 2/2022 | Saraf | G06K 9/6255 |
| 2022/0051139 A1* | 2/2022 | Tullberg | G06N 20/00 |
| 2022/0086864 A1* | 3/2022 | Sabella | H04W 36/0072 |
| 2022/0150723 A1* | 5/2022 | Tsai | H04W 28/0268 |

* cited by examiner

*Primary Examiner* — Steven S Kelley

(57) ABSTRACT

Systems and methods provide an intelligent vehicle to everything (iV2X) service that ensures robust communication of teleoperations and other data. An edge slice proxy system is used to incorporate edge platforms into network slicing considerations. A network device may receive a request for a connection from an end device, such as a vehicle requiring the iV2X service, via wireless signals. The network device may detect that the request is a request for an iV2X service and assign the end device to a network slice that supports stateful and robust iV2X services. The network slice may include one of the virtual network functions executed on the edge platform.

20 Claims, 8 Drawing Sheets

METHODS AND SYSTEM FOR ROBUST SERVICE ARCHITECTURE FOR VEHICLE-TO-EVERYTHING COMMUNICATIONS

BACKGROUND INFORMATION

Next generation wireless communication systems promise reduced latency jitter, and increased bandwidth, and thus may permit on-road moving and stationary vehicles to communicate with each other and/or with various road infrastructure elements and other objects at a much larger scale than possible today. Accordingly, vehicle-to-everything (V2X) communications allow vehicles to exchange information with other vehicles (e.g., vehicle-to-vehicle (V2V) communications), with an infrastructure (e.g., vehicle-to-infrastructure (V2I) communications), with pedestrians (e.g., vehicle-to-pedestrian (V2P) communications), etc. Reliable V2X communications may enhance safety, enable new types of autonomous (with a variety of levels of autonomy) services, and improve vehicle energy efficiency and safety.

DETAILED DESCRIPTION OF PREFERRED EMBODIMENTS

Figure 1:
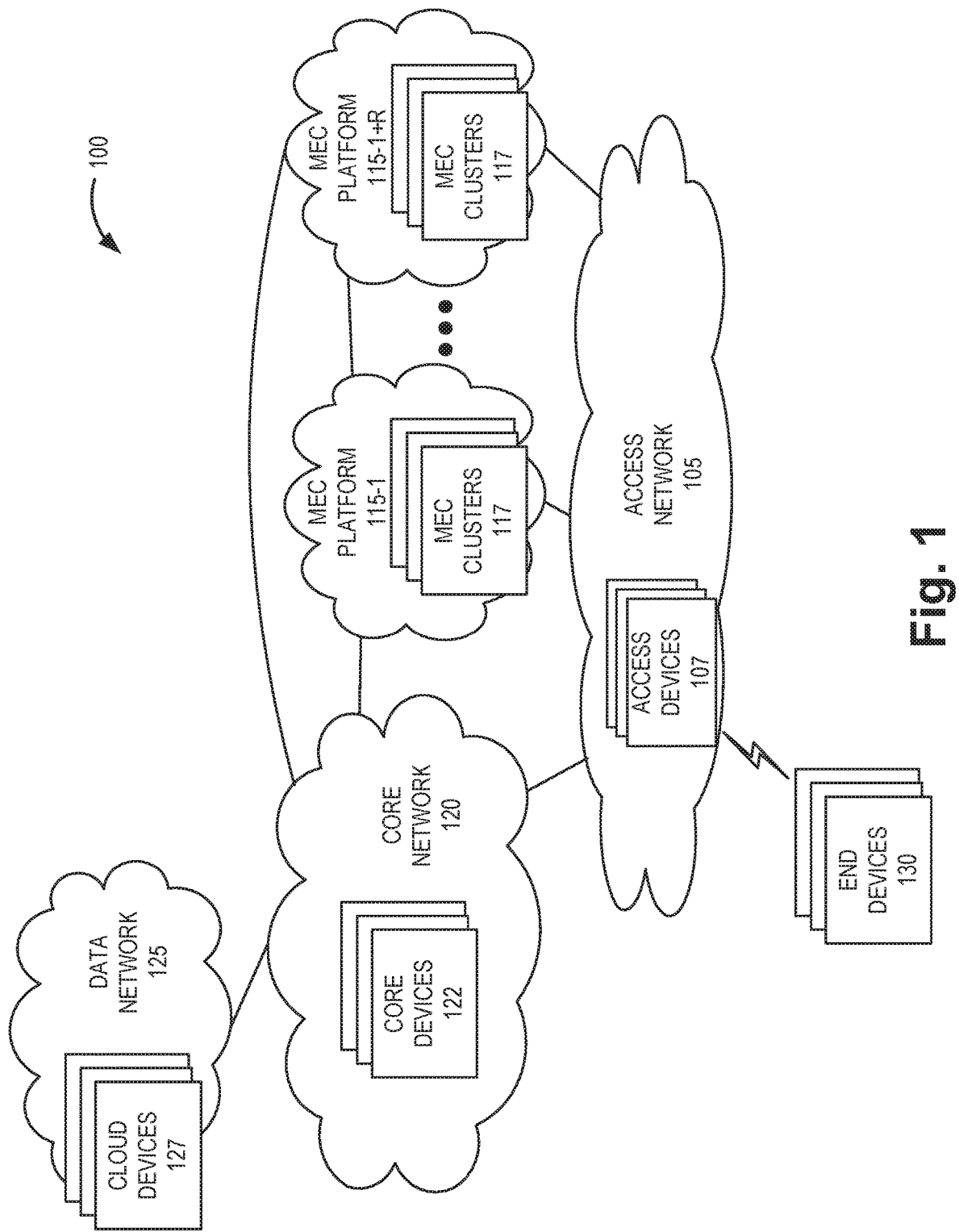
FIG. 1 illustrates an environment according to an implementation described herein.

The following detailed description refers to the accompanying drawings. The same reference numbers in different drawings identify the same or similar elements.

V2X services may be used to support automated guided vehicles (AGVs), drones, unmanned aerial vehicles (UAVs), and other remote controlled devices. Computing resources of an end device (e.g., an AGV, UAV, etc.) are typically insufficient to support the processing required for V2X services. More powerful computing resources may be available via a cloud computing network. However, signal latency associated with traditional cloud-based network communications may preclude adequate service robustness, safety and user experience for V2X services. An enhancement made possible through new broadband cellular networks (e.g., Fifth Generation (5G) New Radio networks) is the use of Multi-access Edge Compute (MEC) platforms (also referred to herein as Mobile Edge Compute platforms). The MEC platforms allow high network computing loads to be transferred onto edge servers which can provide low latency processing and communications to support real-time V2X services.

Service requirements for V2X communications may require near-perfect availability (e.g., 99.9999% availability) to meet necessary safety requirements for some applications. V2X service availability may be compromised by failure/degradation in any one of a number of different inter-connected elements. For example, at any point in time, V2X services may require consistent network connectivity, low network latency, secure communications, low compute delays, and sensor availability, among other conditions. Failures or delays in any of core networks, edge networks, access networks, remote dashboard sites, sensor devices, or vehicle teleoperations systems could result in V2X service disruptions, inducing safety hazards. Generally, these inter-connected elements may be modeled as networks, applications, and services.

Another technology available through new broadband cellular networks is network slicing. Using network slicing, a physical network may be sectioned (or "sliced") into multiple, virtual, end-to-end networks. Each network slice may be dedicated for different types of services with different characteristics and requirements (e.g., latency, voice, jitter, bandwidth, pricing, bonding, etc.). Typically, the term "slice" or "network slice" refers to a complete logical network including a Radio Access Network (RAN) and Core Network that provides certain telecommunication services and network capabilities that can vary from slice to slice. Selection of network slices can, thus, have significant impact on network robustness, performance and user experience. However, network slicing has generally not extended previously to edge networks, such as a MEC network, where virtualized network functions (VNFs) are adaptable to different service demands and conditions.

In order to achieve the required level of operational service availability and robustness for V2X communications, systems and methods described herein provide an intelligent vehicle-to-everything (iV2X) service with sustained connectivity robustness. The iV2X service uses stateful connectivity mechanisms to monitor and predict conditions for supporting V2X communications over both edge and core networks, including network conditions, application status, and service availability.

According to one implementation, an edge slice proxy system is used to incorporate MEC platforms into network slicing considerations. Network devices in a wireless core network may generate network slice data for each network slice available via a wireless station. The network slice data may include the availability of virtual network functions executed on MEC platforms. The core network may receive a request for a connection from an end device (e.g., an AGV requiring iV2X service) via wireless signals. The core network may detect that the request is a request for an intelligent vehicle to everything (iV2X) service and assign the end device to a network slice that supports the iV2X service. The network slice may include one of the virtual network functions executed on the MEC cluster.

The iV2X service may continually monitor and adapt network connectivity to ensure that communications for navigational decisions are supported. In one aspect, a vehicle detects and captures any internal data and external data from applications and sensors. Internal data may include network connectivity data generated from applications and sensors attached or connected to the vehicle, such as embedded sensors, dynamic input to passenger devices, or something in the environment. External data may include network connectivity data generated from applications and sensors separate from the vehicle. The vehicle may process (or filter) the internal and external data for anomalies, malfunctions, and/or misbehaviors and then, in cooperation with the MEC platform and a remote dashboard (RDB), may automate the prevention of accidents and hacking into the vehicle operations. According to one aspect, the iV2X service may train and generate connectivity models that can be applied by the vehicle, RDB, and/or MEC platform to adapt behaviors and network connectivity to ensure availability and robustness of services.

FIG. 1 is a diagram illustrating an exemplary environment 100 in which an exemplary embodiment of the iV2X service may be implemented. As illustrated, environment 100 includes access network 105, a multi-access edge computing (MEC) platform 115-1 through 115-R (also referred to collectively as MEC platforms 115, and individually or generally as MEC platform 115), a core network 120, and a data network 125. Access network 105 includes access devices 107 (also referred to individually or generally as access device 107). MEC platform 115 includes MEC clusters 117 (also referred to individually or generally as MEC cluster 117). Core network 120 includes core devices 122 (also referred to individually or generally as core device 122). Data network 125 includes cloud devices 127 (also referred to individually or generally as cloud device 127). Environment 100 further includes end devices 130 (also referred to individually or generally as end device 130).

The number, type, and arrangement of networks illustrated in environment 100 are exemplary. For example, according to other exemplary embodiments, environment 100 may include an additional and/or a different application service layer network. Additionally, or alternatively, other networks not illustrated in FIG. 1 may be included, such as an X-haul network (e.g., backhaul, mid-haul, fronthaul, etc.) or another type of network (e.g., a packet data network (PDN), the Internet, or other type of network), as described herein.

The number, the type, and the arrangement of network devices, and the number of end devices 130 are exemplary. A network device, a network element, or a network function (also referred to as a network device) may be implemented according to one or multiple architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, hybrid, etc.), edge, fog, and/or another type of computing architecture, and may be incorporated into various types of network architectures (e.g., software defined network (SDN), virtual network, logical network, network slice, overlay or underlay networks, etc.).

Environment 100 includes communication links between the networks, between the network devices, and between end devices 130 and the network/network devices. Environment 100 may be implemented to include wired, optical, and/or wireless communication links. A connection via a communication link may be direct or indirect. For example, an indirect connection may involve an intermediary device and/or an intermediary network not illustrated in FIG. 1. A direct connection may not involve an intermediary device and/or an intermediary network. The number, type, and arrangement of communication links illustrated in environment 100 are exemplary.

Environment 100 may include various planes of communication including, for example, a control plane, a user plane, a service plane, and a network management plane. Control and user planes can be integrated or separate, or a combination of both may also be supported. Environment 100 may include other types of planes of communication. A message communicated in the iV2X service may use at least one of these planes of communication. Additionally, an interface of a network device may be modified relative to an interface defined by a standard, such as Third Generation Partnership Project (3GPP), International Telecommunication Union (ITU), European Telecommunications Standards Institute (ETSI), GSM Association (GSMA), Open RAN (O-RAN) Alliance, other entity, an interface not defined by a standard, or a new interface of the network device may be provided in order to support the communication (e.g., higher quality transmission and reception of messages, information elements (IE), attribute value pairs (AVPs), etc.) between network devices that support the edge computing-based teleoperations service, as described herein. According to various exemplary implementations, the interface of a network device may be a service-based interface, a reference point-based interface, an O-RAN interface (e.g., virtual and/or proxy), a future generation interface, or other type of interface.

Access network 105 may include one or multiple networks of one or multiple types and technologies via soft and hard bonding mechanisms. For example, access network 105 may be implemented to include a Fifth Generation (5G)-access network (5G-AN) or a 5G-RAN (referred to herein as simply a 5G-RAN)), a future generation RAN (e.g., a Sixth Generation (6G) RAN or subsequent generation RAN). Access network 105 may include a legacy RAN (e.g., a Third Generation (3G) RAN, a Fourth Generation (4G) or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), an optical network, or another type of network that provides access to or can be used as an on-ramp to access network 105, MEC platform 115, and/or core network 120.

Access network 105 may include different and multiple functional splitting, such as options 1, 2, 3, 4, 5, 6, 7, or 8 that relate to combinations of access network 105 and core network 120 including an Evolved Packet Core (EPC) network and/or a 5G Next Generation (NG) core (NGC) network, or the splitting of the various layers (e.g., physical layer, Media Access Control (MAC) layer, RLC layer, and PDCP layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., non-standalone NR, standalone NR, etc.).

Depending on the implementation, access network 105 may include one or multiple types of network devices, such as access devices 107. For example, access device 107 may include a next generation Node B (gNB), an evolved Node B (eNB), an evolved Long Term Evolution (eLTE) eNB, a radio network controller (RNC), a remote radio head (RRH), a baseband unit (BBU), a radio unit (RU), a CU, a DU, a small cell node (e.g., a picocell device, a femtocell device, a microcell device, a home eNB, etc.), open network devices (e.g., O-RAN Centralized Unit (O-CU), O-RAN Distributed Unit (O-DU), O-RAN next generation Node B (O-gNB), O-RAN evolved Node B (O-eNB), 5G ultra-wide band (UWB) nodes, a future generation wireless access device (e.g., a 6G wireless station), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. According to some exemplary implementations, access device 107 may include a combined functionality of multiple RATs (e.g., 4G and 5G functionality, 5G and 5.5G functionality, etc.) via soft and hard-bonding based on demands and needs.

MEC platform 115 includes a network that provides the edge computing-based iV2X service. As illustrated, MEC platform 115 may be located at an edge of a network, such as access network 105. Although not illustrated, MEC platform 115 may be co-located with another type of network, such as access network 105 or core network 120. Alternatively, MEC platform 115 may not be co-located. MEC platform 115 may be implemented using one or multiple technologies including, for example, network function virtualization (NFV), containers, Software Defined Networking (SDN), cloud computing, Infrastructure-as-a-Service (IaaS), Platform-as-a-Service (PaaS), Software-as-a-Service (SaaS), or another type of network technology. Depending on the implementation, MEC platform 115 may include various types of network devices that are illustrated in FIG. 1 as MEC clusters 117. For example, MEC clusters 117 may include a virtual network device (e.g., virtualized network function (VNF), server, host, container, hypervisor, virtual machine, network function virtualization infrastructure (NFVI), and/or other types of virtualization element, layer, hardware resource, operating system, software resource, engine, etc.) and/or a non-virtual network device to provide the iV2X service, as described herein.

According to an exemplary embodiment, and as described further herein, MEC clusters 117 include logic that supports an edge slice proxy for the iV2X service. For example. MEC clusters 117 may provide edge exposure data and function repository data to core network devices for configuring network slices.

MEC platform 115 may host one or multiple application services. The application services may or may not pertain to the edge computing-based teleoperations service, as described herein. For example, the application services may pertain to broadband services in dense areas (e.g., pervasive video, smart office, operator cloud services, video/photo sharing, etc.), broadband access everywhere (e.g., 50/100 Mbps, ultra low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, AR, VR, etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

Core network 120 may include one or multiple networks of one or multiple network types and technologies. For example, core network 120 may be implemented to include a next generation core (NGC) network, an Evolved Packet Core (EPC) of an LTE, an LTE-Advanced, an LTE-A Pro, and/or a future generation core network (e.g., a 6G core network, etc.).

Depending on the implementation, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), a network slice selection function (NSSF), a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., a device that provides a combination of 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

End devices 130 include a device that may have computational and/or communication capabilities (e.g., wireless, wired, optical, etc.). End device 130 may be implemented as a mobile device, a portable device, a stationary device (e.g., a non-mobile device), a device operated by a user, or a device not operated by a user. Additionally, as described herein, end device 130 may be implemented as a remote-controlled device or a remote-controlling device. For example, as a remote-controlled device, end device 130 may be a vehicle (e.g., car, truck, etc.), a drone or other type of aerial vehicle, a robot (e.g., delivery robot, medical-based robot, warehouse robot, sanitization robot, etc.), or other type of device associated with a known or future teleoperations service. Depending on the implementation, end device 130 may include one or multiple video cameras, microphones, and other types of sensors (e.g., Light Detection and Ranging (LIDAR), heat sensor, light sensor, chemical sensor, temperature sensor, olfactory/odor sensor, a global positioning device, threat sensors, or another type of sensor or data collector).

End device 130 may include other processing components associated with sensors, such as an aggregator, an encoder, a decoder, other components that support remote control of end device 130 (e.g., command interpretation and execution), and so forth. End device 130 may include logic that transmits information to a remote-controlling device via MEC platform 115, and may receive information from the remote-controlling device via MEC platform 115. End device 130 may receive commands from the remote-controlling device via MEC platform 115 or from MEC network (e.g., when the remote-controlling service of MEC cluster 117 is active), and include logic to interpret and execute the commands. For example, in relation to a remote-controlled vehicle, various commands such as turn left, turn right, stop, brake, accelerate, and other types of commands that control the movement and/or operation of the vehicle may be received and executed.

Also, for example, as a remote-controlling device, end device 130 may include a computer (e.g., a tablet, a desktop, a laptop, a netbook, etc.) with various peripherals (e.g., a display, a joystick, pedals, steering wheel, or other input and/or output devices). Depending on the level (fully or partial or hybrid) of autonomy associated with the remote-controlled device and/or teleoperations service, the remote-controlling device may or may not be operated by a human user.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and variations of network slicing, DC service, and/or other types of connectivity services. Additionally, end device 130 may include one or multiple communication interfaces that provide one or multiple (e.g., simultaneous) connections via the same or different RATs, frequency bands, carriers, network slices, and/or other communication medium (e.g., wired, etc.). The multimode capabilities of end device 130 may vary among end devices 130.

Figure 2:
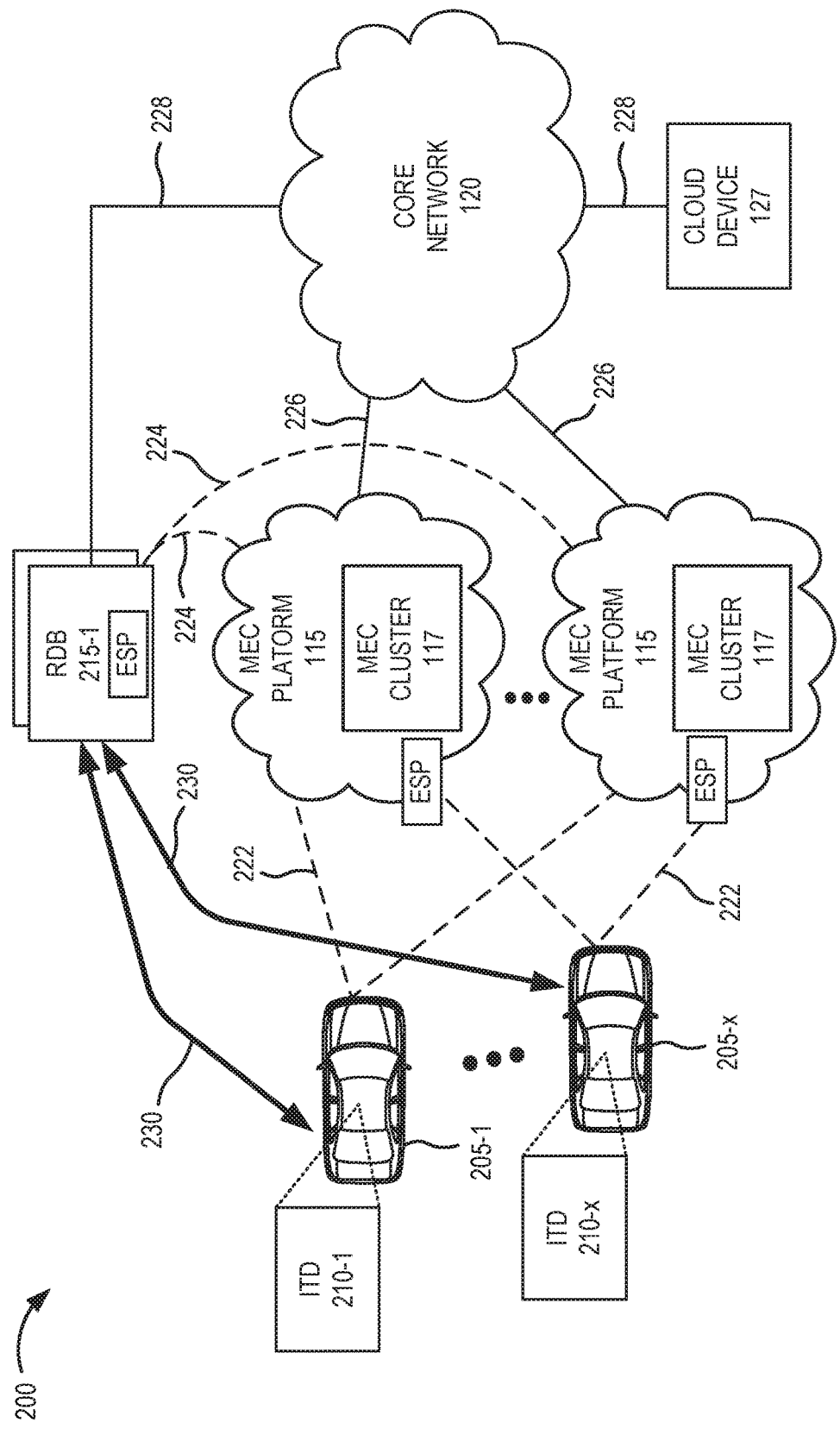
FIG. 2 is a diagram illustrating communication links among components in a portion of the environment of FIG. 1.

FIG. 2 is a diagram illustrating communication links among components in a portion 200 of environment 100. As shown in FIG. 2, multiple vehicles 205-1 through 205-X (referred to individually and generally as vehicles 205) and remote dash boards (RBDs) 215 may correspond to end devices 130. Vehicles 205 may each include an intelligent teleoperations dashboards (ITD) 210-1 through 210-X (referred to individually and generally as ITD 210) that enable vehicles 205 to be controlled, for example, via RBDs 215. Vehicle 205 may include, for example, an AGV, a drone, a UAV, and the like.

Network portion 200 may provide cloud native and/or standalone core mobile network functions with slicing support at both the core (core network 120) and edge (MEC platforms 115). Network portion 200 may include network links (e.g., links 222, 224, 226, 228, and 230) with support of network slicing coordination and management functions in both edge networks (MEC platform 115) and core networks (core network 120). Links 222, 224, 226, 228, and 230 may be indirect, involving one or intermediary devices and/or networks not shown in FIG. 2. According to an implementation, links 222, 224, 226, 228, 230 may support high speed, low latency communications. Network links 222 may include, for example, mobile broadband links between an ITD 210 and one or more local/regional MEC platforms 115. Similarly, network links 224 may include, for example, mobile broadband links between RBD 215 and one or more local/regional MEC platforms 115. Network links 226 may include a high-speed (e.g., terabyte per second) link between a MEC platform 115 and core network 120 and/or cloud devices 127 in data network 125. Network links 228 may include a high-speed (e.g., gigabytes per second) link between, for example, a RDB 215 and core network 120 and/or cloud devices 127 in data network 125. Network links 230 may provide a stateful robust mobile link between vehicle 205 and RDB 215.

Vehicle 205 may serve as a mobile end point including one or more (aggregated) multi-RAT-bonded wireless hotspot devices. In some implementations, vehicle 205 may employ network bonding beyond what RAT-types cellular bond provides (e.g., to include Wi-Fi, Citizen bands, and others). Vehicle 205 may monitor (e.g., via sensors and corresponding applications) changes in the environment detected by audio-video devices, infra-red (IR) cameras, radar, LIDAR, etc., (collectively referred to herein as "sensors") for proactive and predictive monitoring. According to an implementation, ITD 210 may be embedded in a device that can be plugged into vehicle 205 or placed in a slot/cradle in, for example, vehicle 205 or in a mobile phone that is carried by a passenger of vehicle 205.

Vehicle 205 may detect internal and surrounding notifications via sensors and applications, e.g., route optimization can be achieved using guidance, advisories (free or subscription-based), inputs/suggestions, etc. from maps and navigation services to avoid active construction zones, crowded areas, accident areas, etc. Vehicle 205 may also make estimations on, for example, network conditions/connectivity based on predicted and simulated vehicle 205 trajectory. Vehicle 205 may report these estimations in real-time in a state-preserving or stateful manner to RDB 215 (e.g., via link 230). Vehicle 205 may utilize Intelligence (based on threat detection and learning models) from MEC platform 115 and cloud devices 127 at data network 125 under the instruction of RDB 215. According to one aspect, vehicle 205 may make local decisions, but only execute decisions jointly to improve service availability and operational robustness including detection and prevention of hacking.

RBD 215 may operate remote vehicle 205/ITDs 210, monitor operations, and apply machine learning to improve service availability/robustness continuously. According to one aspect, RBD 215 may also actively prevent hacking into any of the units of the fleet.

RBD 215 may support on-demand stateful network slicing using ESP for remote collaboration including augmented/virtual reality support. RBD 215 may collect and distribute basic safety measures-related information to the fleet (e.g., multiple vehicles 205/ITDs 210) under management of the RBD 215. RBD 215 may configure the requirements and run a software agent (or application) to perform assessment/augment/predict and self-learning, including predicting and recommending network parameters and supporting slice allocation/pre-allocation for the application(s) used by vehicle 205/ITD 210. RBD 215 may allow the use the software agent as add-ons (parts of the teleoperations service stack and/or jointly with MEC) or a standalone offer/service.

MEC platform 115 may track network conditions/connectivity and states of agents and services (e.g., stateful tracking) in real-time in vehicles 205/ITDs 210. MEC platform 115 may develop intelligence to ensure robustness (against interference and impairments) by tapping into bands with correct quality of service (QoS)/quality of experience (QoE) profile, network slices as applicable, etc., and may predict resource shortages for planning purposes. MEC platform 115 may utilize the Edge Slice Proxy (ESP) as needed to facilitate edge/local level learning, modeling and resources coordination/management.

MEC platform 115 may receive inputs (e.g., continuously or frequently per configuration) from base stations (e.g., access devices 107) and other Element Management Systems (EMSs) for any current and historical network conditions including alerts and outage information for predicting and recommending (learned) models based network parameters and setup for the applications. MEC platform 115 may manage motion and mobility data for very-low-latency services (e.g., that need less than thirty millisecond response time). MEC platform 115 may also coordinate and manage a local fleet of vehicles 205 (e.g., a fleet of AGVs within a region covered by a MEC platform 115).

Cloud device 127 may be implemented, for example, in data network 125 (as shown in FIG. 1) or in core network 120. Cloud device 127 may track agents and hosts in RDB 215 and MEC platforms 115. Cloud device 127 may incorporate the required features in the software agent in order to perform assessment and prediction, including self-learning and recommending parameters (e.g., network parameters) to maintain application/service robustness. Cloud device 127 may develop and push networking resources sharing profiles for allocation/pre-allocation to satisfy all connectivity and bandwidth needs including reallocation of resources across MEC platform 115. Cloud device 127 may utilize the software agents as both add-ons and standalone entities at the vehicle 205/ITD 210 teleoperations stack and MEC platform 115 for hot-standby services. As described, for example, in connection with FIGS. 4-6, cloud device 127 may also monitor the operations of MEC-managed fleets for improving service continuously.

Figure 3:
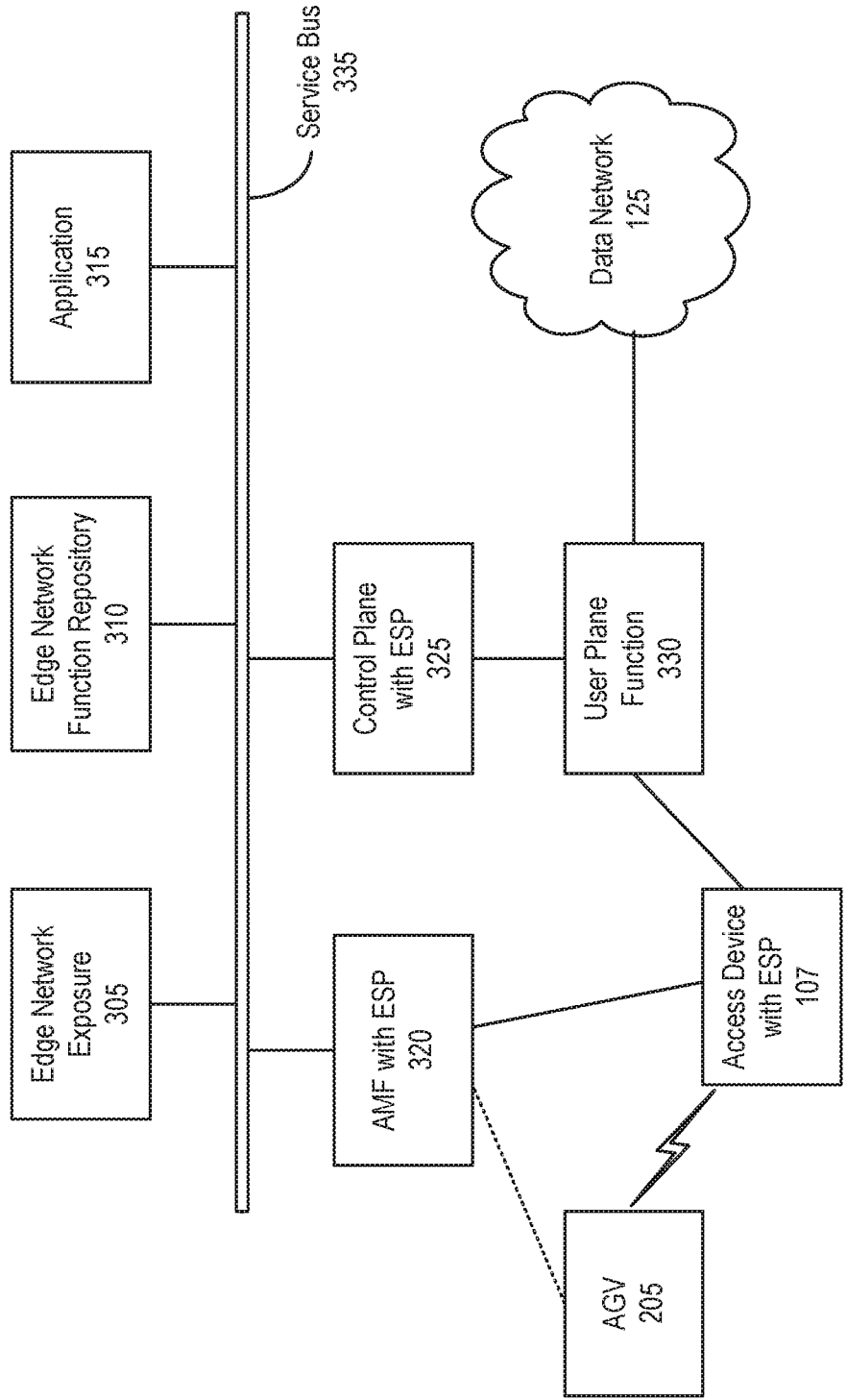
FIG. 3 is a diagram illustrating exemplary logical components for implementing an edge slice proxy (ESP) service structure in a portion of the environment of FIG. 1.

FIG. 3 is a diagram illustrating exemplary logical components for implementing an edge slice proxy (ESP) service structure 300. The edge slice proxy may generally facilitate extending features and functionality of network slicing to the MEC platforms 115. As shown in FIG. 3, ESP service structure 300 may include an edge network exposure function 305, an edge network function repository 310, an application 315, an access and mobility management function (AMF) with ESP 320, a control plane function with ESP 325, a user plane function (UPF) 330, and a service bus 335.

Edge network exposure function (NEF) 305 may provide continuous updates from each MEC cluster 117 of MEC platform availability. For example, edge network exposure function 305 may publish connectivity status to different access devices 107 and connection times (e.g., uplink/downlink times). Edge network function repository 310 may include a listing of VNFs available at each MEC platform 115, including active VNFs or VNF that are available to be instantiated. Application 315 may include, for example, a teleoperations application, augmented reality application, or another application for use by vehicle 205/ITD 210. Application 315 may communicate application data, instructions, connectivity requirements, and network connectivity information, for example.

AMF 320 with ESP may include an AMF that is equipped to receive and interpret data from edge network exposure function 305 and edge network function repository 310. AMF 320 may apply data from edge network exposure function 305 and edge network function repository 310 to generate network slice assignments and to inform access devices 107 what network slices are available. The network slice data may include, for example, the availability of what virtual network functions are operating on a MEC platform 115.

Control plane function 325 with ESP may be used to assign physical and virtual network functions (e.g., MEC cluster 117) to network slices. Where core network 120 and/or access network 105 support separation of control and user planes (such as in 5G networks), a control and user plane separation (CUPS) gateway can be strategically placed near the edge (e.g., MEC platform 115) in order to support both in-band (same channel) and out-of-band (separated, as in CUPS) signaling for the purpose of achieving service safety and robustness. Depending on the implementation, a CUPS gateway may be included within edge network exposure function 305, AMF 320, control plane function 325, or distributed among multiple of these functions.

UPF 330 performs packet routing and forwarding, packet inspection, and Quality of Service (QoS) handling. UPF 220 may act as a router and a gateway between core network 120 and an external data network 125 and may forward session data between data network 125 and access network 105, or between MEC platforms 115 and access network 105. Core network 120 may include multiple UPFs 330 disposed at various geographic locations (only a single UPF 330 is shown for purposes of simplicity).

Service bus 335 may include a message bus, such as a Data Movement as a Platform (DMaaP) system that provides a data movement service to transports and processes data from any source (i.e., a "producer") to any target (i.e., a "consumer"). In one implementation, service bus 335 may be implemented, for example, using a publish-subscribe format to support ESP communications described above. In another implementation, HTTP GET-PUT or other commands may be used to support the ESP communications.

Although FIG. 3 illustrates some components of service structure 300, in other implementations ESP service structure 300 may include fewer, additional, or different, components.

Figure 4:
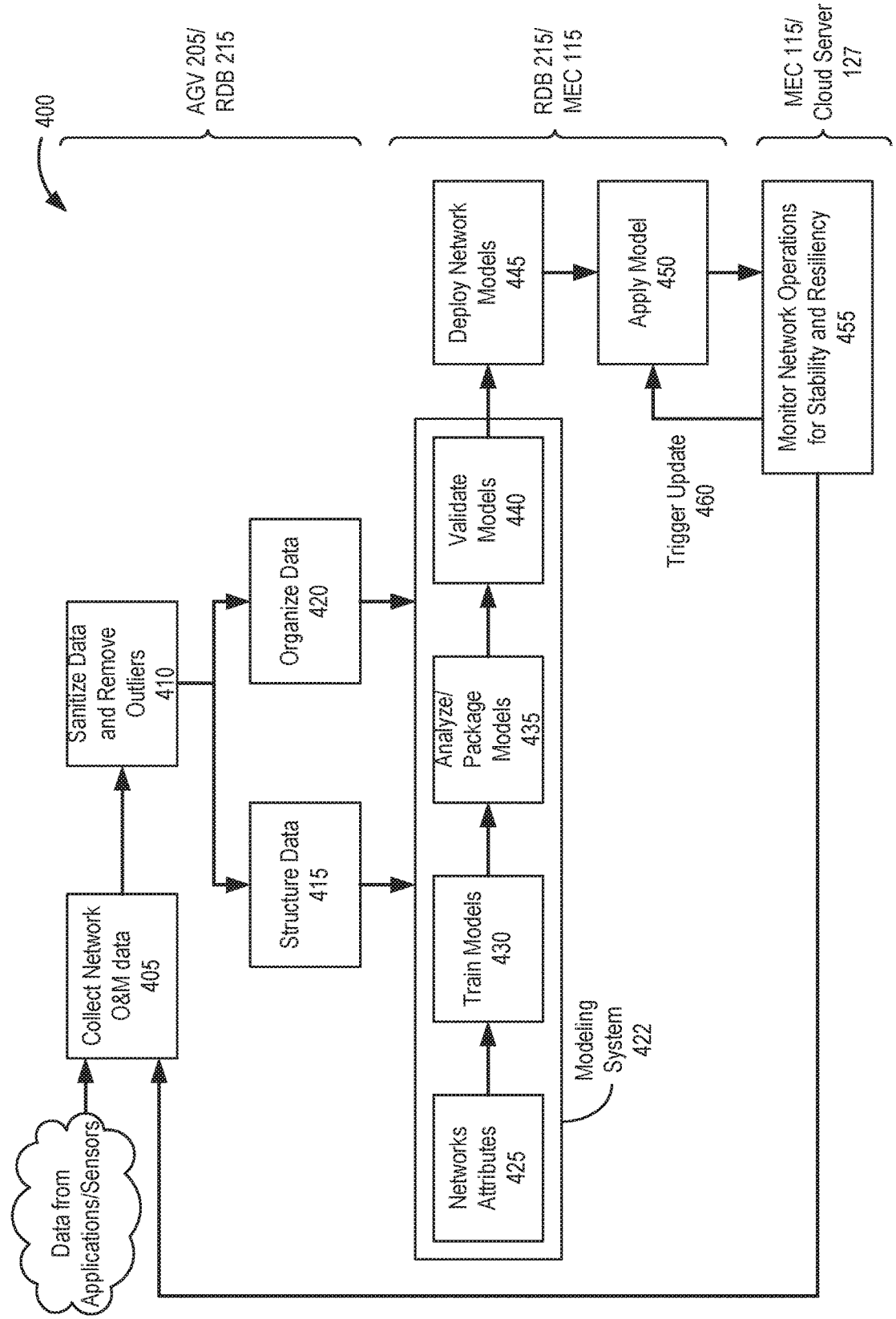
FIGS. 4-6 illustrate process flows for conducting applications, services, and network connectivity parameter adjustments, respectively, to maintain stability and robustness of a network.

FIG. 4 illustrates network communications 400 for conducting network connectivity parameter adjustment to maintain stability and robustness of a network. As shown in FIG. 4, process 400 may be performed by one or more devices in network portion 200, such as vehicle 205, RDB 210, MEC cluster 117, and/or cloud devices 127.

As shown at reference 405, vehicle 205 may collect network operations and maintenance (O&M) data from the input data. For example, vehicle 205 may continuously receive input data from various applications and sensors associated with (or relevant to) an iV2X system, along with feedback data from monitoring systems in backend networks. The input data may include sensor internal data and external data. For example, for a given vehicle 205, the applications and sensors can monitor and register a variety of information to display status in the local ITD 210. As one example, thermal or heat (differential temperature) sensor map may be provided for indicating presence and/or movement of an entity in front/back and/or around vehicle 205 within a certain distance. Additionally, vehicle 205 may obtain radio frequency conditions around vehicle 205 for activity (voice, text, image, video, and other communications) monitoring at directions and distances (of interest) from vehicle 205. Also, vehicle 205 may receive location and loading conditions of network gateways for anything (software, communications, identifications, detection, etc.) as a service (i.e, XaaS gateways), which can be placed in MEC platform 115 locations. In still another aspect, vehicle 205 may receive information and decision harvesting conditions, metrics, etc., in order to learn the trends of service usage and other ambient conditions. Still further, local vehicle 205 may provide internal threat levels (ITLs) and external threat levels (ETLs), each of which could be ranked, for example, as "Low," "Medium" or "High." According to one implementation, information from applications and sensors in vehicle 205 may be applied to a proprietary or open source tool that provides system diagramming and a rule engine to automatically determine and rank security threats, suggest mitigations, and implement countermeasures.

In addition to those described above, other potential sources of information and data may also be used with appropriate permissions. For example, live and human interventions (e.g., medical monitoring, heart attack, vitals, etc.), frequency-band scanning, heat/radiation monitoring, and smart grid operations data; palm data; interchange of messages via e.g., gaming and live/stored media platforms; embedded apps and services in smart phones, such as diagnostic analysis applications; network bonding beyond what cellular bond provides e.g., include WiFi, Citizen bands, and others; Software as a service (SaaS) gateways for white-listed services like teleoperations, emergency, safety, etc.; applications or engines to harvest relevant data from base stations, control/media gateways, deep packet inspection (DPI) devices (as allowed), mobility tracing/management entities, network slice management entity, etc. Other data sources may also be used, as required and desired, to reduce the probability of undetected interferences and improve the confidence level of detections.

From the collected network O&M data, vehicle 205 may treat anomalies in the received internal network connectivity data and external network connectivity data to form treated network data. For example, vehicle 205 may identify anomalies and remove data outliers 410. Vehicle 205 may structure the data 415 and organize the data 420 for further processing by RDB 215 and/or MEC platform 115. The structured/organized data may be provided to a modeling system 422, which may be included in RDB 215 and/or MEC platform 115. Modeling system 422 may manage modeling of network connectivity and service scenarios for applications being used by vehicle 205. For example, modeling system 150 may use the structured/organized data to train models for connection options/resources for use of a particular application by vehicle 205. Modeling system 422 may, for example, model parameters for connection changes, perform validation of training, and/or otherwise manage the training and/or operation of a network connectivity model associated with a vehicle 205.

Network attributes 425 for applications (e.g., V2X applications) may be identified, for example, by machine learning. For example, attributes for networks (e.g., latency, bandwidth, jitter, etc.) that are needed to support a particular application or multiple simultaneous applications may be determined. The models for the application(s) network attributes may be trained 430, analyzed and packaged 435, and validated 440. The validated network model(s) may be deployed 445 for use by vehicle 205 and/or RDB 215, for example, to provide stateful connectivity and continued resiliency for V2X communications. With the model in use, cloud devices 127 and/or MEC clusters 117 may monitor 455 network operations for stability and resiliency. Based on the monitoring, cloud devices 127 and/or MEC cluster 115 may trigger an update of the network model, if necessary. Monitoring data may be provided back to vehicle 205 and/or RDB 215 for incorporation and training.

Figure 5:
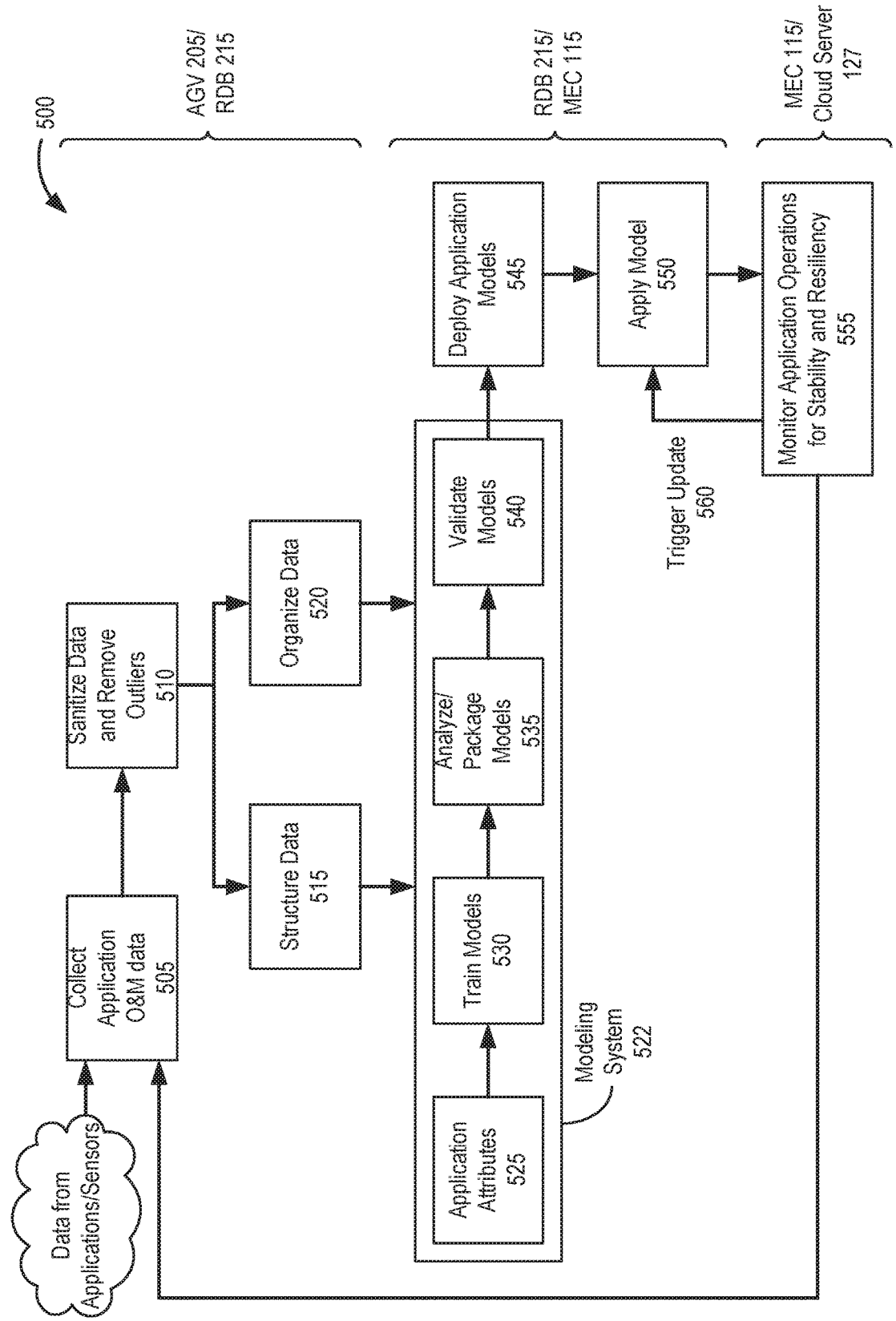

FIG. 5 illustrates network communications 500 for conducting connectivity parameter adjustment to maintain stability and robustness of an application. Similar to process 400 of FIG. 4, network communications 500 may be performed by one or more devices in network portion 200, such as vehicle 205, RDB 210, MEC cluster 117, and/or cloud devices 127. Network communications 500 includes steps similar to those of FIG. 4. References 505-560 generally correspond to the above description for references 405-460. However, while process 400 is directed to learning and adaptation of networking to achieve stateful connectivity and continued resiliency, process 500 is directed to learning and adaptation of applications and their operations. Thus, a modeling system 522 used in process 500 may generate and implement models directed to one or more applications to support stateful connectivity and continued resiliency. For example, in FIG. 5, application attributes 525 for V2X applications (e.g., logging, compatibility, error handling, etc.) may be identified, for example, by machine learning.

Figure 6:
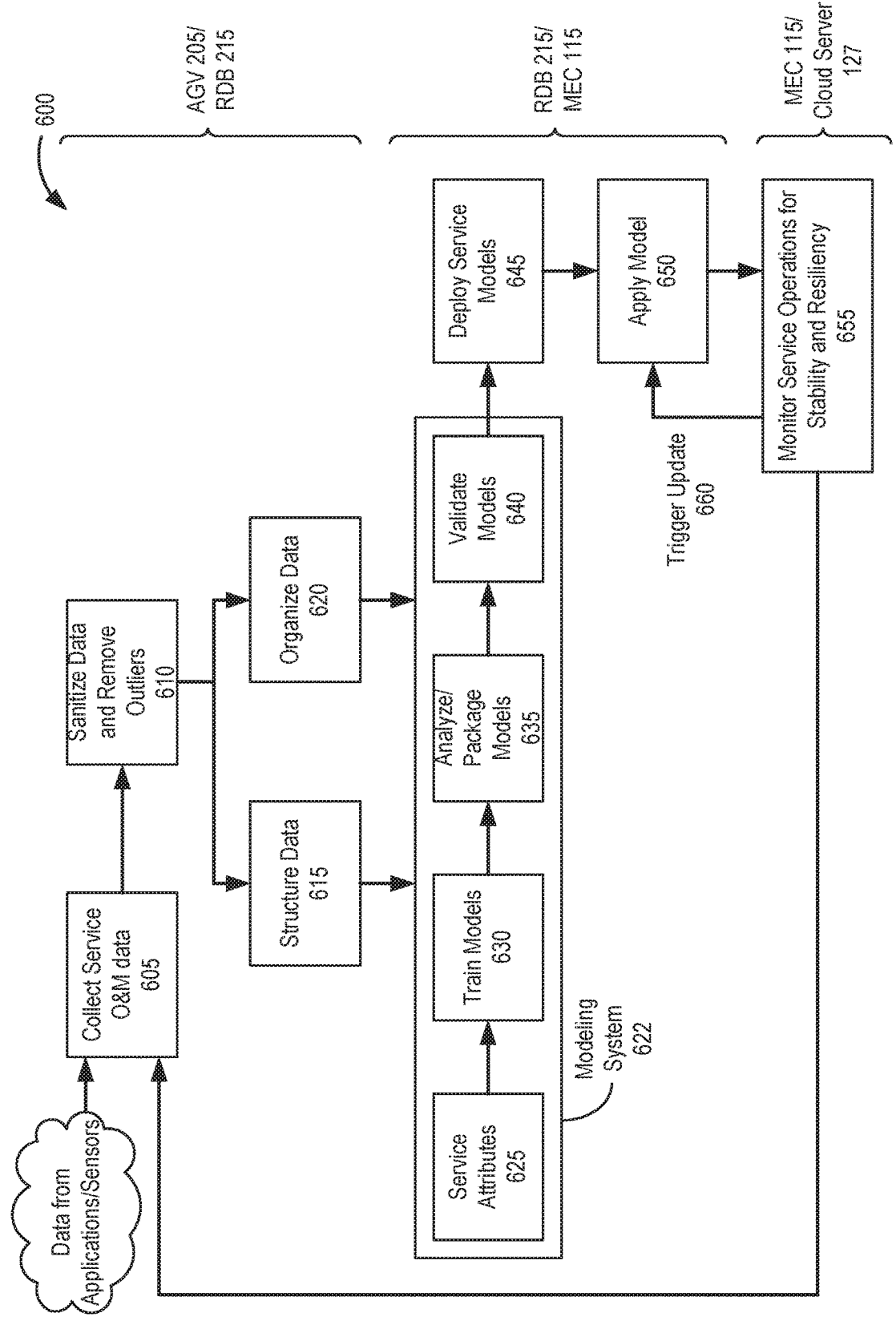

FIG. 6 illustrates network communications 600 for conducting connectivity parameter adjustment to maintain stability and robustness of services. Similar to process 400 of FIG. 4, network communications 600 may be performed by one or more devices in network portion 200. Network communications 600 includes steps similar to those of FIG. 4. Particularly, references 605-660 generally correspond to the above description for references 405-460. However, while process 400 is directed to learning and adaptation of networking to achieve stateful connectivity and continued resiliency, process 600 is directed to learning and adaptation of services and their operations. Thus, modeling system 622 may generate models directed to one or more services to support stateful connectivity and continued resiliency. For example, in FIG. 6, service attributes 625 for V2X applications (e.g., sensor availability, RDB/MEC compute delays, etc.) may be identified, for example, by machine learning According to an implementation, network communications 400 for network connectivity can be jointly utilized with network communications 500 for applications in order to deliver resiliency of augmented and virtual reality applications, such as those used with vehicle 205 (e.g., an AGV) and RDB 215. Similarly, network communications 400 can be jointly used with network communications 600 for services for resiliency of services that need network slice and slice capacity management for e.g., robust navigation/guidance of AGV fleets among both friendly and foreign static/mobile objects/entities.

Figure 7:
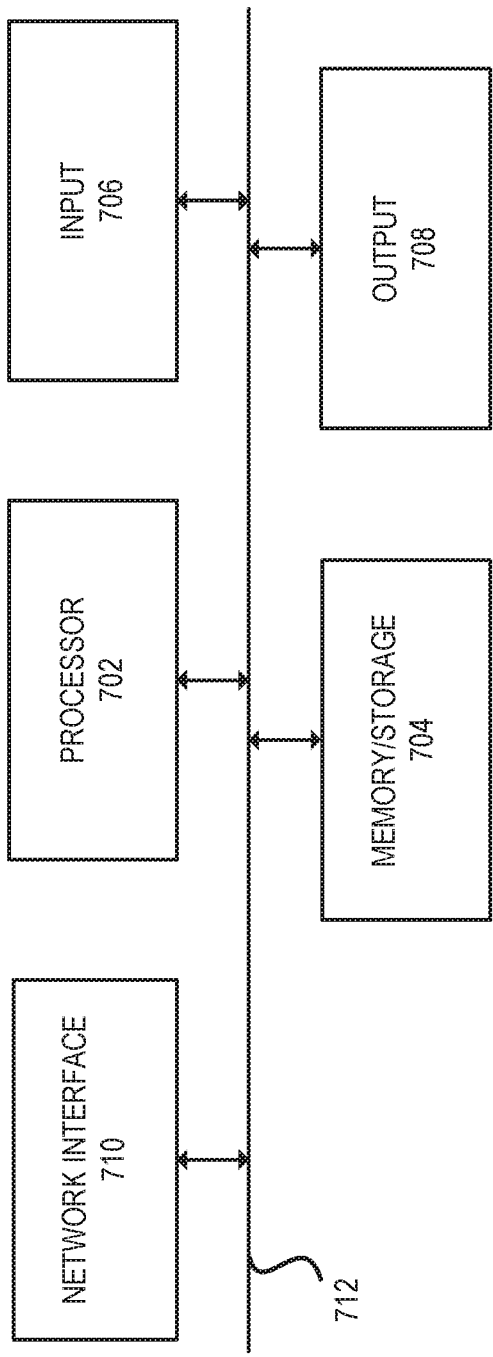
FIG. 7 illustrates exemplary components of a device that may be included in the environment of FIG. 1 according to an implementation described herein.

FIG. 7 is a diagram illustrating example components of a device 700 according to an implementation described herein. End devices 130, MEC devices 117, core devices 122, and cloud devices 127 may each include, or be implemented on, one or more devices 700. As shown, network device 700 includes a processor 702, memory/storage 704, input component 706, output component 708, network interface 710, and communication path 712. In different implementations, network device 700 may include additional, fewer, different, or a different arrangement of components than the ones illustrated in FIG. 7. For example, network device 700 may include a display, network card, etc.

Processor 702 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontrollers, and/or another processing logic device (e.g., embedded device) capable of controlling device 700 and/or executing programs/instructions.

Memory/storage 704 may include static memory, such as read only memory (ROM), and/or dynamic memory, such as random access memory (RAM), or onboard cache, for storing data and machine-readable instructions (e.g., programs, scripts, etc.).

Memory/storage 704 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 704 may be external to and/or removable from network device 700. Memory/storage 704 may include, for example, a Universal Serial Bus (USB) memory stick, a dongle, a hard disk, off-line storage, a Blu-Ray® disk (BD), etc. Memory/storage 704 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 706 and output component 708 may provide input and output from/to a user to/from device 700. Input and output components 706 and 708 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 700.

Network interface 710 may include a transceiver (e.g., a transmitter and a receiver) for network device 700 to communicate with other devices and/or systems. For example, via network interface 710, network device 700 may communicate with wireless station 110.

Network interface 710 may include an Ethernet interface to a LAN, and/or an interface/connection for connecting device 700 to other devices (e.g., a Bluetooth interface). For example, network interface 710 may include a wireless modem for modulation and demodulation.

Communication path 712 may enable components of network device 700 to communicate with one another. Network device 700 may perform the operations described herein in response to processor 702 executing software instructions stored in a non-transient computer-readable medium, such as memory/storage 704. The software instructions may be read into memory/storage 704 from another computer-readable medium or from another device via network interface 710. The software instructions stored in memory or storage (e.g., memory/storage 704, when executed by processor 702, may cause processor 702 to perform processes that are described herein. For example, vehicle 205 and RDB 215 may each include various programs for performing some of the above-described functions for the iV2X service.

Figure 8:
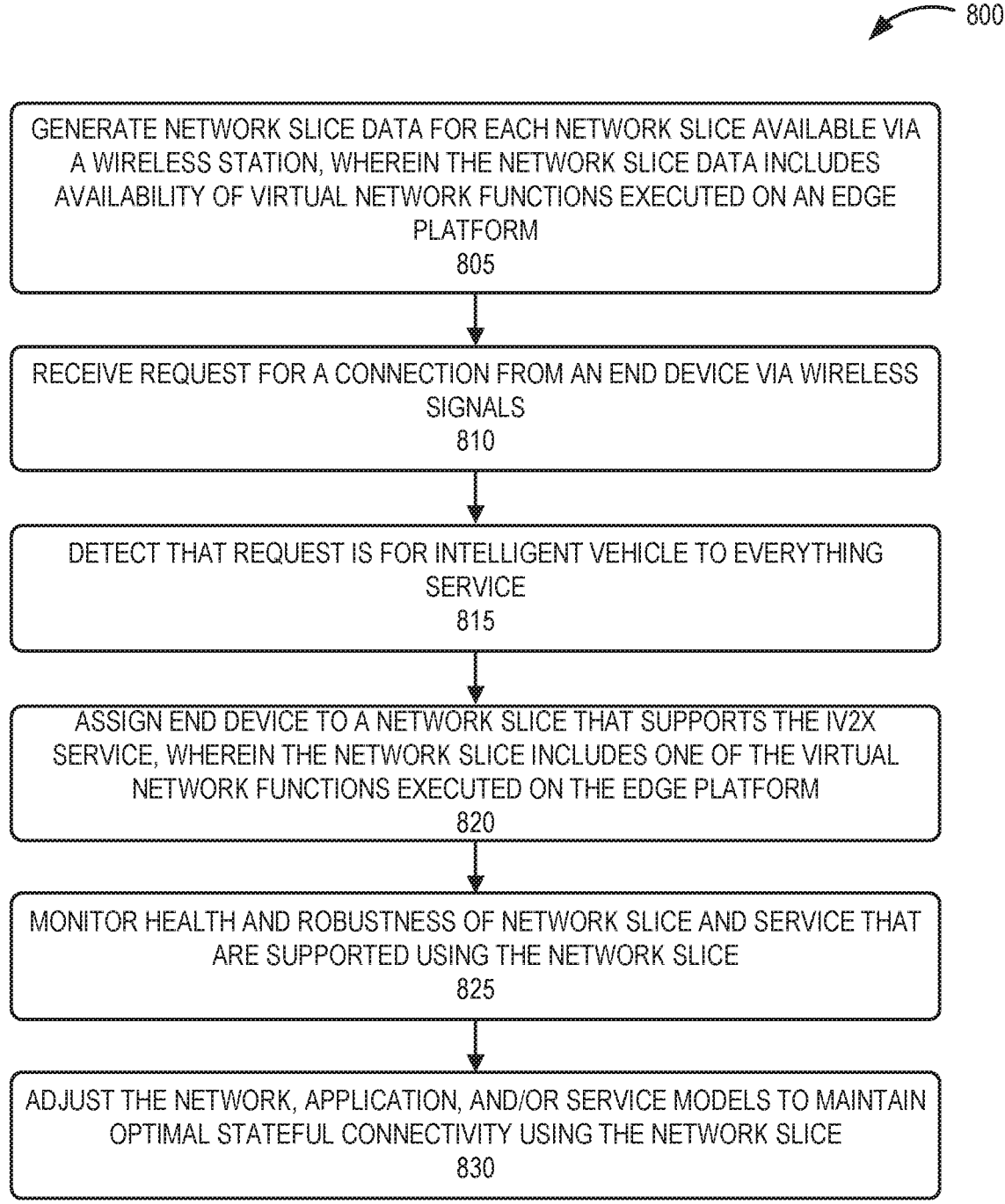
FIG. 8 is a flow diagram for a process for providing a robust service architecture for intelligent vehicle-to-everything (iV2X) operations, according to an implementation described herein.

FIG. 8 is a flow diagram illustrating an exemplary process 800 for providing a robust service architecture for iV2X operations. According to an implementation, AMF 320 may perform steps of process 800. In other implementations, some steps of process 800 may be performed by AMF 320 in conjunction with MEC platforms 115 and RDB 215 implementing ESP functionality.

Referring to FIG. 8, process 800 may include generating network slice data for each network slice available via a wireless station, wherein the network slice data includes availability of virtual network functions executed on an edge platform (block 805). For example, AMF 320 may use service bus 335 to collect edge network exposure data and available edge network functions from MEC platforms 115.

Process 800 may also include receiving a request for a connection from an end device via wireless signals (block 810), and detecting that the request is a request for an intelligent vehicle to everything service (block 815). For example, vehicle 205 may provide a request (e.g., a RRC request) to establish a teleoperations session with RDB 210. Conversely, RDB 210 may provide a request to establish a teleoperations session with vehicle 205. Vehicle 205 and/or RDB 210 may be configured, for example, with network slice selection assistance information (NSSAI) or other information that may be used to identify use of the iV2X service.

Process 800 may additionally include assigning the end device to a network slice that supports the iV2X service, wherein the network slice includes one of the virtual network functions executed on the edge platform (block 820). For example, AMF 320 may assign vehicle 205 and/or RDB 215 to a network slice that includes a MEC platform 215. Use of network slicing including MEC platform 215 may support stateful signaling (e.g., over links 222, 224, 230) to monitor network connections, model connection quality (e.g., for network connections, applications, and services), apply the models, and monitor resiliency using the models.

Process 800 may further include monitoring the health and robustness of the network slice and service that are supported using the slice (block 825), and adjusting the network, application, and/or service models to maintain optimal stateful connectivity using the network slice (block 830). For example, MEC clusters 117, core devices 122, and/or cloud devices 127 may continuously monitor the health and robustness of the network slice and supporting services, which may include both internal (passengers in AGV) and external (objects & obstacles) surroundings, that are supported using the network slice. Based on the learned model(s) and environment (e.g., from sensors), core devices 122 may adjust the network slice characteristics to maintain stateful connectivity for iV2X services even in adverse conditions.

Systems and methods provide an iV2X service that ensures robust communication of teleoperations and other data in V2X systems. Intelligence is added in order to track condition(s) in real-time—for example sensing/monitoring foreign objects/elements including impairments—in order to maintain application/service robustness. The iV2X service may use connectivity, sensing/detection of objects/elements, augmented/virtual reality collaboration, etc. According to one use case, connectivity robustness can be maintained by proactive monitoring of network conditions for dynamically adjusting bonding (any band, WiFi, CBRS, etc.). In another use case, security robustness can be maintained by proactively updating protection tools and bindings. In still another user case, ambient and confidential compute robustness can be maintained by proactively adjusting resources (e.g., in MEC platform 115). In still another use case, perception robustness/precision can be achieved by fine tuning the detection capability of vehicles 205/RDB 215 in order to avoid collisions/fatalities, e.g., detecting and avoiding (a) malfunctioning static/mobile objects, (b) impaired/distracted human beings.

In contrast with systems that rely on hardware-based recognition and cellular bonding to ensure service robustness, the systems and methods described herein provide flexibility and extendibility using edge slice techniques.

Thus, the systems and methods describe herein can quickly adapt to support new and emerging services and scenarios. Existing systems need extensive hardware and software upgrades/integration in order to improve services, prevent hacking, and improve threat (internal and external) awareness.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 4-6 and 8, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 702, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 702) of a device. A non-transitory storage medium includes one or more of the storage mediums described in relation to memory 704.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   generating, by one or more network devices in a wireless core network, network slice data for each network slice available via a wireless station, wherein the network slice data includes availability of virtual network functions executed on an edge platform;
   receiving, by the one or more network devices, a request for a connection from an end device associated with a vehicle via wireless signals;
   detecting, by the one or more network devices, that the request is a request for an intelligent vehicle to everything (iV2X) service;
   receiving, at the end device, internal network connectivity data for the end device and external network connectivity data from other sources;
   removing, by the end device, anomalies in the received internal network connectivity data and external network connectivity data to form treated network connectivity data;
   forwarding to the edge platform the treated network connectivity data;
   generating, based on the treated network connectivity data, a network model that automates connection adaptations to deliver resilient communications for the end device;
   assigning, based on the network model, by the one or more network devices, the end device to a network slice that supports the iV2X service, wherein the network slice includes one of the virtual network functions executed on the edge platform; and providing the assigned network slice to the end device via the wireless station.

2. The method of claim 1, wherein the one or more network devices include an access and mobility management function (AMF) instance for a wireless core network.

3. The method of claim 1, further comprising:
receiving, from multiple edge platforms that include the edge platform, continuously updated edge network exposure data and edge network function repository data.

4. The method of claim 1, wherein the internal network connectivity data includes data generated from applications and sensors connected to the vehicle, and
wherein the external network connectivity data includes network connectivity data generated from applications and sensors separate from the vehicle.

5. The method of claim 1, further comprising:
receiving, at the end device, internal application data for the end device and external application data from other sources;
removing, by the end device, anomalies in the received internal application data and external application data to or from treated application data; and
forwarding to the edge platform the treated application data.

6. The method of claim 5, further comprising:
generating, based on the treated application data, an application model to deliver resilient communications for the end device; and
sending the application model to the end device.

7. The method of claim 1, further comprising:
receiving, at the end device, service data for the end device;
removing, by the end device, anomalies in the received service data to form treated service data; and
forwarding to the edge platform the treated service data.

8. The method of claim 1, wherein the end device includes:
a vehicle with an intelligent teleoperations dashboard (ITD), or
a remote dashboard (RDB) for the ITD.

9. A system, comprising:
one or more network devices including one or more processors to execute instructions to:
generate network slice data for each network slice available via a wireless station, wherein the network slice data includes availability of virtual network functions executed on an edge platform;
receive a request for a connection from an end device associated with a vehicle via wireless signals;
detect that the request is a request for an intelligent vehicle to everything (iV2X) service;
receive, at the end device, internal network connectivity data for the end device and external network connectivity data from other sources;
remove, by the end device, anomalies in the received internal network connectivity data and external network connectivity data to form treated network connectivity data;
forward to the edge platform the treated network connectivity data;
generate, based on the treated network connectivity data, a network model that automates connection adaptations to deliver resilient communications for the end device;
assign, based on the network model, the end device to a network slice that supports the iV2X service, wherein the network slice includes one of the virtual network functions executed on the edge platform; and
provide the assigned network slice to the end device via the wireless station.

10. The system of claim 9, wherein the one or more processors are further to execute instructions to:
receive, from multiple edge platforms that include the edge platform, continuously updated edge network exposure data and edge network function repository data.

11. The system of claim 10, wherein, when receiving the continuously updated edge network exposure data and edge network function repository data, the one or more processors are further to execute instructions to:
receive the continuously updated edge network exposure data and edge network function repository data via a service bus.

12. The system of claim 9, wherein the one or more processors are further to execute instructions to:
send the network model to the end device for implementation.

13. The system of claim 9, wherein the one or more processors are further to execute instructions to:
receive, from the end device, internal application data for the end device and external application data from other sources, wherein the internal application data and external application data are treated by the end device to remove anomalies.

14. The system of claim 9, wherein the one or more processors are further to execute instructions to:
receive, from the end device, internal service data for the end device and external service data from other sources; and
generate, based on the internal service data and the external service data, a service model to automate delivery of resilient services for the end device.

15. The system of claim 9, wherein the end device includes:
a vehicle with an intelligent teleoperations dashboard (ITD), or
a remote dashboard (RDB) for the ITD.

16. A non-transitory computer-readable storage medium storing instructions executable by a processor of a network device, which when executed by the processor cause the network device to:
generate network slice data for each network slice available via a wireless station, wherein the network slice data includes availability of virtual network functions executed on an edge platform;
receive a request for a connection from an end device associated with a vehicle via wireless signals;
detect that the request is a request for an intelligent vehicle to everything (iV2X) service;
receive, at the end device, internal network connectivity data for the end device and external network connectivity data from other sources;
remove, by the end device, anomalies in the received internal network connectivity data and external network connectivity data to form treated network data;
forward to the edge platform the treated network connectivity data;
generate, based on the treated network connectivity data, a network model that automates connection adaptations to deliver resilient communications for the end device;
assign, based on the network model, the end device to a network slice that supports the iV2X service, wherein the network slice includes one of the virtual network functions executed on the edge platform; and provide the assigned network slice to the end device via the wireless station.

17. The non-transitory computer-readable medium of claim 16, further comprising instructions to:

receive, from multiple edge platforms that include the edge platform, continuously updated edge network exposure data and edge network function repository data.

18. The non-transitory computer-readable medium of claim 16, further comprising instructions to:

receive, from the end device, application data or service data for the end device, wherein the application data or service data is filtered by the end device to remove anomalies.

19. The non-transitory computer-readable medium of claim 17, further comprising instructions to:

generate, based on the filtered application data, an application model, directed to one or more applications, for supporting stateful connectivity and continued resiliency.

20. The non-transitory computer-readable medium of claim 17, further comprising instructions to:

generate, based on the filtered service data, a service model, directed to one or more services, for supporting stateful connectivity and continued resiliency.

* * * * *